March 14, 1972   M. L. BURROUS ET AL   3,649,721
LOW ALKALI METAL CONTENT HYDRAULIC FLUIDS AND THEIR PREPARATION
Filed March 2, 1970
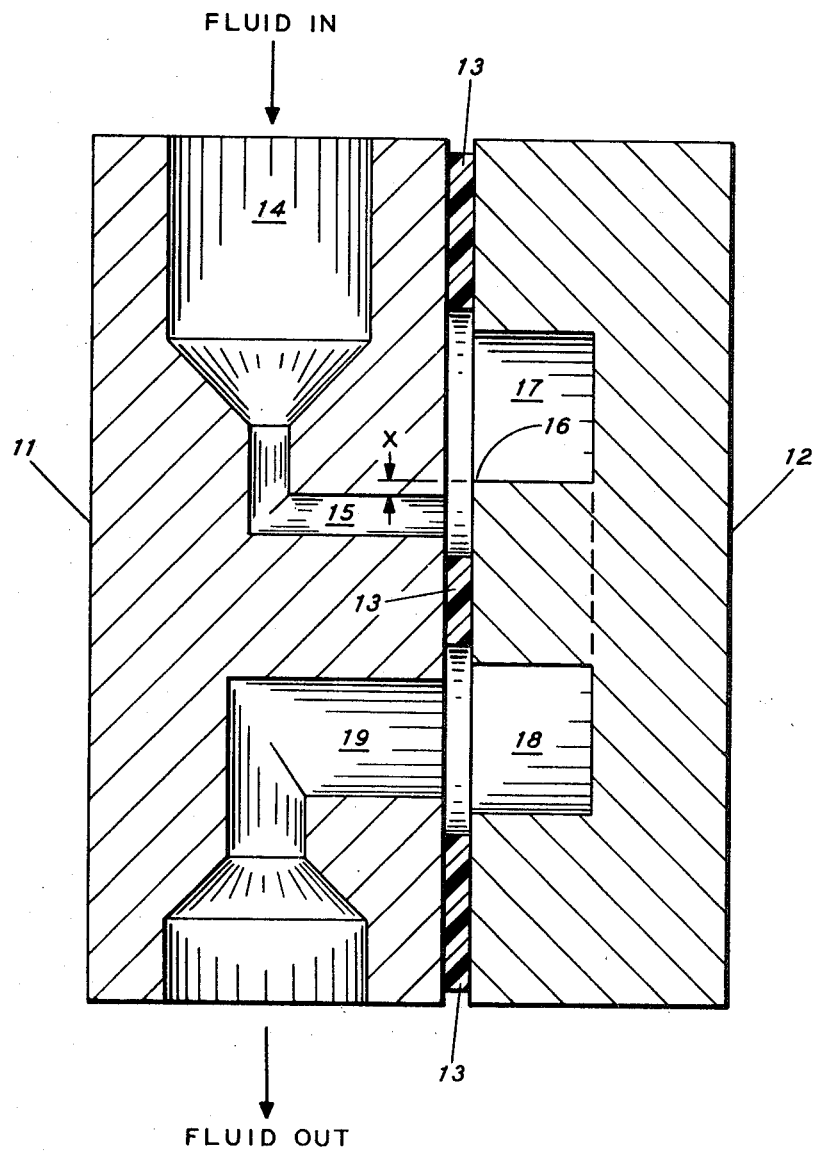
INVENTORS
MERWYN L. BURROUS
NEAL W. FURBY
BY *James W. McClain*
*Richard S. Rowland*
ATTORNEYS United States Patent Office 3,649,721
Patented Mar. 14, 1972

3,649,721
LOW ALKALI METAL CONTENT HYDRAULIC
FLUIDS AND THEIR PREPARATION
Merwyn L. Burrous, El Cerrito, and Neal W. Furby, Berkeley, Calif., assignors to Chevron Research Company, San Francisco, Calif.
Continuation-in-part of application Ser. No. 865,471, Oct. 10, 1969. This application Mar. 2, 1970, Ser. No. 15,392
Int. Cl. C07f 9/02
U.S. Cl. 260—990
11 Claims

ABSTRACT OF THE DISCLOSURE

Improved phosphate ester hydraulic fluids are prepared by treating them to reduce their alkali metal content to 0.1–4.0 p.p.m. Treating procedures include clay contacting and liquid/liquid extraction. The fluids and their method of preparation are claimed.

CROSS-REFERENCE TO OTHER APPLICATIONS

This application is a continuation-in-part of application Ser. No. 865,471, filed Oct. 10, 1969.

BACKGROUND OF THE INVENTION

Field of the invention

This invention relates to the production of phosphate ester hydraulic fluids having a reduced tendency to cause valve erosion in hydraulic systems.

For some years now, commercial jet aircraft have used phosphate ester hydraulic fluids as essentially the exclusive force transmission medium in their hydraulic systems. (As used herein, "phosphate ester hydraulic fluids" or "phosphate ester fluids" will refer to hydraulic fluids which contain as their principal component one or more phosphate esters. These fluids are described in detail below.) Phosphate ester fluids have enjoyed this preeminent position principally because, as compared to mineral oil hydraulic fluids, the phosphate ester fluids are less flammable while yet maintaining the other desirable properties of an aircraft hydraulic fluid. Low flammability of the hydraulic fluid is a necessity in order to minimize the danger of fire following an aircraft accident.

The complex hydraulic system of a typical jet airplane contains a fluid reservoir, fluid lines, and numerous hydraulic valves which actuate various moving parts of the aircraft, such as the wing flaps, ailerons, rudder, and landing gear. These valves, in order to function as precise control mechanisms, often contain passages or orifices having clearances on the order of a few thousandths of an inch or less through which the hydraulic fluid must pass.

Recently, there have been observed a number of instances in which a metering edge in a valve was found to have been substantially eroded by the flow of the phosphate ester fluid through it. This erosion increased the size of the passage and reduced to below tolerable limits the ability of the valve to serve as a precise control mechanism. Early investigation indicated the possibility that the erosion was being caused by cavitation in the fluid, as the fluid passed at high velocity from the high-pressure to the low-pressure side of the valve. Additives, such as water, were incorporated into the fluid to suppress cavitation damage and data collected shortly thereafter seemed to indicate that suppression of cavitation damage had materially reduced the occurrence of valve erosion. Continuing experience, however, has shown that a significant erosion problem remains.

Description of the prior art

A recent study by Beck et al., "Corrosion of Servo Valves by an Electrokinetic Streaming Current," Boeing Scientific Research Document D1–82–0839 (September 1969), concludes that the principal valve damage mechanism is corrosion due to electrical currents caused by fluid flow, and that cavitation is only a minor factor. An article by Hampton, "The Problem of Cavitation Erosion in Aircraft Hydraulic System," Aircraft Engineering, XXXVIII, No. 12, 8 (December 1966) describes the general problem of valve erosion and the efforts to control it by treating it as basically a cavitation phenomenon. Netherlands patent application No. 66/14183 describes a typical phosphate ester hydraulic fluid to which water has been added in an attempt to suppress cavitation and thereby reduce valve erosion. The text, Organophosphorus Compounds, by Kosolapoff (John Wiley & Sons, Inc., New York: 1950) on pages 220 through 237, describes numerous methods of preparation of phosphate esters. Numerous patents, including U.S. Pats. Nos. 2,636,861, 2,636,862, 2,894,911, 2,903,428, and 3,036,012 describe typical phosphate ester hydraulic fluids. Belgian patent application 728,309 discloses the use of diepoxides in phosphate ester fluids.

SUMMARY OF THE INVENTION

In the production of hydraulic fluid having as a major portion at least one phosphate ester, this invention is the improvement which comprises treating the hydraulic fluid to reduce its alkali metal content to 0.1–4.0 p.p.m. Preferably, the alkali metal content of the finished phosphate ester fluid is reduced to 0.2–2.0 p.p.m.

BRIEF DESCRIPTION OF THE DRAWING

The figure illustrates schematically a sectional view of a device which simulates the flow of fluid through a hydraulic valve which is susceptible to erosion.

DETAILED DESCRIPTION OF THE INVENTION

In its broadest form, the invention comprises an improvement in the production of a hydraulic fluid, having as its sole or major component a "phosphate ester portion" consisting of at least one phosphate ester, the improvement comprising treating the fluid or any alkali-metal-contaminated portion thereof to reduce the alkali metal content of the fluid to 0.1–4.0 p.p.m. Preferably, the alkali metal content is reduced to 0.2–2.0 p.p.m.

The minimum alkali metal content specification is based on economic and practical rather than technical considerations. Fluids having alkali metal contents less than the maxima specified are quite satisfactory in service, but the greatly increased cost of attempting to reduce alkali metal content below the minima specified cannot be justified in view of the lack of further improvement in the fluid properties.

The alkali metal content reduction may be accomplished in a number of ways, including numerous conventional methods which are well known to those skilled in the art.

One convenient and relatively inexpensive method is to contact the fluid with clay. Contacting may be by passing the fluid through a clay bed, or by thoroughly mixing the fluid with finely divided clay and then filtering the clay/fluid mixture to remove the clay. The weight ratio of fluid to clay may be in the range of 1000–10:1 (0.1–10.0 wt. percent clay, based on fluid weight), preferably 400–20:1 (0.25–5.0 wt. percent clay), with the optimum practical ratio being 400–200:1 (0.25–0.50 wt. percent clay).

A second means of alkali metal removal is by ion exchange. The alkali-metal-containing fluid is passed through an ion exchange resin in which the alkali metal cation is preferentially adsorbed onto the ion exchange resin and displaces a cation initially there. In order to avoid contaminating the fluid with the displaced cation, it is preferred that the cation to be displaced be one that will not be readily soluble in the phosphate ester fluid. This displaced cation, while generally not reincorporated into the fluid, will remain in the ion exchange apparatus, from which it can be cleaned following treatment of the fluid.

A third method of alkali metal removal is by extraction with a liquid which is immiscible with the fluid and has an affinity for alkali metals. An example of such a liquid is water. Approximately 0.25–5.0 volumes of extractant per volume of fluid are normally used. The alkali metal ions are preferentially dispersed in the extractant phase of the extractant/phosphate ester fluid mixture. The two phases may then be separated by conventional liquid/liquid separation means and the purified phosphate ester fluid recovered.

Other means of alkali metal removal include adding to the fluid materials which will form insoluble complexes or compounds with the alkali metal, and then precipitating the insoluble reaction product. One may also filter the fluid to remove that portion of the alkali metal which may be present in particulate form.

The entire fluid may be treated as a batch to reduce alkali metal content. Alternatively, the individual components of the fluid which may contain alkali metals may be treated individually or in groups prior to blending of the final fluid. (Throughout this specification, reference to "treating the fluid" will be intended to include the treatment of individual alkali-metal-contaminated portions, unless the context clearly indicates that the latter is specifically excluded.)

Ordinarily, the only alkali-metal-contaminated components are some of the various phosphate esters present in the fluid. Most commonly one or more of the alkyl or mixed alkyl/aryl esters contains some alkali metal. It is these materials which may advantageously be treated for alkali metal removal prior to blending of the finished fluid. Regardless of which treating scheme is employed, the final alkali metal content is measured on the finished fluid.

The alkali metal most commonly found in phosphate ester fluids is sodium, and this invention particularly contemplates its removal from the fluid. However, the other alkali metals, when present, also affect the erosive characteristics of the phosphate ester fluid, and their removal is also within the scope of this invention. Other than sodium, the alkali metals most likely to be present are lithium and potassium.

The alkali metal may be present in ionic form or as an element in a complex, a radical, or a compound. It may be dissolved in the fluid or present in a suspended particle. Any one or more of these various forms may be present in the fluid at any given time. This invention contemplates removal of the alkali metal independent of its form in the fluid, and also independent of any associated materials which might be removed simultaneously. Throughout this specification alkali metal contents will be expressed in equivalents of the elemental metal, independent of its form or association.

The process of this invention may also be used to recondition fluid which has become contaminated with more than 4.0 p.p.m. alkali metal during use, and has thus developed an unacceptable tendency to cause valve erosion, and restore to it an alkali metal content of less than 4.0 p.p.m. In the absence of other disqualifying characteristics unrelated to alkali metal content (e.g., degradation of the phosphate esters), the reconditioned fluid may be reused in hydraulic systems.

The phosphate esters which comprise the major portion (the "phosphate ester portion") of the hydraulic fluid with which this invention is concerned have the formula

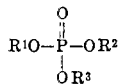

wherein $R^1$, $R^2$, and $R^3$ each represents an alkyl or aryl hydrocarbon group. (As used herein, "aryl" includes aryl, alkaryl, and aralkyl structures, and "alkyl" includes aliphatic and alicyclic structures.) All three groups may be the same, or all three different, or two groups may be alike and the third different. A typical fluid will contain at least one species of phosphate ester and usually will be a mixture of two or more species of phosphate esters.

The phosphate esters will each have a total carbon content of 3–36 carbon atoms. Individual alkyl groups will usually have 1–12 carbon atoms, while individual aryl groups will usually have 6–12 carbon atoms. Preferred esters contain 12–24 total carbon atoms, preferred alkyl groups 4–6 carbon atoms, and preferred aryl groups 6–9 carbon atoms. The alkyl groups may be straight- or branched-chain, with straight chain, such as n-butyl, preferred. Similarly, the alkyl substituents in alkaryl structures may also be straight- or branched-chain.

Typical phosphate esters which may be included in a phosphoate ester hydraulic fluid are:

TRIALKYL PHOSPHATES trimethyl phosphate
triethyl phosphate
tripropyl phosphate
tributyl phosphate
tripentyl phosphate
trioctyl phosphate
tridecyl phosphate
tridodecyl phosphate
methyl diethyl phosphate
ethyl dimethyl phosphate
butyl dihexyl phosphate
hexyl dioctyl phosphate
dibutyl octyl phosphate
tricyclohexyl phosphate
tri(4-methylcyclohexyl) phosphate

TRIARYL PHOSPHATES triphenyl phosphate
tricresyl phosphate
trixylyl phosphate
trinaphthyl phosphate
tri(ethylphenyl) phosphate
phenyl dicresyl phosphate
phenyl dixylyl phosphate
cresyl dixylyl phosphate
diphenyl cresyl phosphate
phenyl cresyl xylyl phosphate
phenyl di(ethylphenyl) phosphate
tricumyl phosphate
phenyl dicumyl phosphate
cresyl dicumyl phosphate
tri(3,5-isopropylphenyl) phosphate

MIXED ALKYL/ARYL PHOSPHATES methyl diphenyl phosphate
ethyl diphenyl phosphate
diethyl phenyl phosphate
butyl diphenyl phosphate
butyl dicresyl phosphate
dibutyl cresyl phosphate
dibutyl phenyl phosphate
octyl diphenyl phosphate
hexyl dicresyl phosphate
decyl diphenyl phosphate It is to be understood that in the above list the general terms denoting carbon number include all of the various structural configurations within each carbon number. For instance, the term "butyl" includes n-butyl, sec.-butyl, and tert.-butyl radicals and mixtures thereof. Similarly, the term "octyl" includes isomers such as 2-ethylhexyl. The aryl structures include all of the various ortho-, meta-, and para-structures; e.g., cresyl includes ortho-cresyl, meta-cresyl, and para-cresyl radicals. The various isomers may appear in mixed configurations, such as n-butyl di-t.-butyl phosphate.

In practice, the phosphate ester fluid generally contains several phosphate esters mixed together. Usually one particular ester or several closely related esters will predominate. In a preferred type of fluid, the phosphate ester portion contains only trialkyl and triaryl phosphate esters, with the trialkyl phosphate esters predominating. Typically the phosphate ester portion of this fluid will consist of 70–98 weight percent, preferably 80–92 weight percent, trialkyl phosphate esters, with the remainder triaryl phosphate esters. The phosphate ester portion is normally 75–95 weight percent of the total fluid, and preferably 85–95 weight percent.

The phosphate ester hydraulic fluid generally contains a number of additives which, in total, will comprise 5–25 weight percent of the finished fluid. Among these is water, which may be added intentionally (as is described, for instance, in the aforementioned Netherlands patent application). Water also often becomes incorporated into hydraulic fluids without intentional addition. Such incorporation can occur when a hydraulic system is being refilled and is open to the atmosphere, particularly in humid environments. Unintentional incorporation of water may also occur during the manufacturing process of the phosphate fluid.

In practice, it is recognized that water will be incorporated into the fluid, and steps are taken to control the water content at a level in the range of 0.1–1.0 weight percent of the whole fluid. It is preferred that the water content be in the range of 0.2–0.8 weight percent, and more preferably 0.2–0.6 weight percent. Water content is measured by the well-known "Karl Fischer Reagent" method described in volume XIV of the Encyclopedia of Chemical Technology on page 923 (1st Ed.: Interscience Publishers, 1955).

Hydrolysis inhibitors to retard corrosion are often added to phosphate ester hydraulic fluids. They will be present as 0.1–15 weight percent of the finished fluid, preferably 0.1–5 weight percent. They include various epoxides such as the glycidyl ethers described in aforesaid U.S. Pat. 2,636,861. Typical epoxide compounds which may be used include glycidyl methyl ether, glycidyl isopropyl ether, isobutylene oxide, butadiene monoxide, styrene oxide, ethylene oxide, and epichlorohydrin. Hydrocarbon sulfides, especially hydrocarbon disulfides such as dialkyl disulfide, are often used in combination with the epoxide compounds for additional corrosion suppression. Typical hydrocarbon disulfides include benzyl disulfide, butyl disulfide, and diisoamyl disulfide.

A particularly preferred class of epoxide hydrolysis inhibitors are those containing two linked cyclohexane groups to each of which is fused an epoxide (oxirane) group. Illustrative are those in which the linking structure contains a carboxylic acid ester group, andw hich have the generic formula

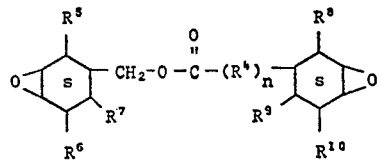

wherein $R^4$ is a divalent radical containing 1 to 15 carbon atoms and 0 to 6 oxygen atoms, and $n$ is an integer of from 0 to 1. Preferably $R^4$ contains 2 to 10 carbon atoms and 0 to 4 oxygen atoms. $R^5$, $R^6$, $R^7$, $R^8$, $R^9$, and $R^{10}$ are each hydrogen or lower aliphatic radicals. As defined herein, "lower aliphatic" refers to those aliphatic radicals containing 1 to 5 carbon atoms. In a preferred embodiment, $R^5$ through $R^{10}$ are all hydrogen. In another preferred embodiment, two of the six are methyl radicals (preferably $R^7$ and $R^9$) and the other four are hydrogen.

The $R^4$ radical may be an alkylene radical, such as methylene, ethylene, butylene, decylene, pentadecylene, or phenylene, or it may contain linear ether or ester linkages, carboxyl, or hydroxyl groups. Preferred are those compounds wherein $R^4$ is an alkylene radical or a radical having the structure

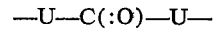

wherein U represents an alkylene radical.

The phosphate ester fluids normally contain 2–10 weight percent, preferably 5–10 weight percent, of one or more viscosity index improving agents such as alkylated styrene polymers, polymerized organic silicones, or, preferably polyisobutylene or the polymerized alkyl esters of the acrylic acid series, particularly acrylic or methacrylic acid esters. These polymeric materials generally have a number average molecular weight of from about 5,000 to 300,000, although the preferred range is 5,000 to 50,000, and more preferably 5,000 to 20,000.

The preferred polymerized alkyl esters of acrylic or methacrylic acid contain as their repeating unit a structure of the formula

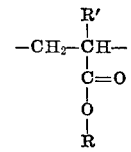

wherein $R'$ is a hydrogen or methyl radical, and R is an alkyl group containing at least four, and preferably 12–18 carbon atoms. The commercial polyacrylates and methacrylates available are mixtures of several acrylate or methacrylate ploymers of different chain lengths, with the overall number average molecular weight falling in the ranges disclosed above.

Phosphate ester hydraulic fluids also often contain additional components. These include the polymerized alkylene oxides or glycols, and esters of $C_4$–$C_{12}$ dicarboxylic acids. Typical are the sebacates and the adipates, produced by reacting sebacic or adipic acid with $C_2$–$C_{15}$ alcohols; a typical sebacate product is di(2-ethylhexyl) sebacate. The fluids also usually contain very small amounts of anti-foaming agents and dyes.

It has recently been found that the rate of valve erosion in aircraft hydraulic system valves varies with the streaming potential of the hydraulic fluid passing through the valve. Streaming potential is defined on pages 4–30 of the Electrical Engineers' Handbook, by Pender and Del Mar (New York: John Wiley & Sons, Inc., 1949). It is the EMF created when a liquid is forced by pressure through an orifice and is a function of factors such as the electrical properties and viscosity of the liquid, the applied pressure, and the physical characteristics of the orifice.

Streaming potential is, as noted above, dependent on several factors, and, because of variation in these factors one finds that streaming potential measurements of a given fluid on a given apparatus will vary over a small range from day to day. For this reason the ordinary practice is to select as a standard a fluid which is considered to have acceptable erosive characteristics. Each day the apparatus is calibrated by measuring the streaming potential of the standard fluid and then comparing the streaming potential of the test fluids against the standard.

In the experiments from which the present inventive discovery resulted, the fluid selected as the standard was a phosphate ester hydraulic fluid which had been shown to have good erosion characteristics in aircraft hydraulic valves. We discovered that if the alkali metal content of phosphate ester fluids was reduced to 0.1–4.0 p.p.m., or preferably 0.2–2.0 p.p.m., the streaming potential of the treated fluid would be as much as five times less than the standard fluid, and that the treated fluids then showed essentially no tendency to cause valve erosion.

We also discovered that reduction of the alkali metal content to 0.1–4.0 p.p.m. effected a substantial reduction in the conductivity and a corresponding increase in the volume resistivity of the fluid. For example, a tributyl phosphate containing 20 p.p.m. of sodium had a conductivity of $3.3 \times 10^6$ picomho/meter and a volume resistivity of $3 \times 10^7$ ohm/cm.; the corresponding values for the same material containing only 2 p.p.m. of sodium were $5.0 \times 10^5$ picomho/meter and $2 \times 10^8$ ohm/cm.

The apparatus used to measure streaming potential is described in detail in the Beck et al. report referred to above. For convenience, the streaming potential detected by the apparatus is impressed across a standard 100,000 ohm resistor to obtain a resultant amperage, which is reported as the "streaming current."

The following examples will serve to illustrate this invention.

EXAMPLE 1

A 1000 g. sample of tributyl phosphate having a streaming current of 2.4 $\mu$amp and an alkali metal (sodium) content of 26 p.p.m. was contacted with 5 g. of Filtrol clay, Grade 20, for five minutes at ambient temperature. The mixture was then filtered to remove the clay. The treated tributyl phosphate had an alkali metal content of 3.6 p.p.m. and a streaming current of 1.2 $\mu$amp, both measured relative to the tributyl phosphate alone and not as blended in a finished fluid.

EXAMPLE 2

A 1000 g. sample of the same tributyl phosphate as in Example 1 was contacted with 5 g. of Filtrol clay fines (maximum particle size less than 8 microns) for five minutes at ambient temperature. The treated and filtered tributyl phosphate (unblended) had an alkali metal content of 1.1 p.p.m. and a streaming current of 0.6 $\mu$amp.

EXAMPLE 3

A 1500 g. sample of the same tributyl phosphate as in Example 1 was washed six times in successive 250 ml. volumes of water and then dried over a commercial calcium sulfate and filtered. The washed tributyl phosphate (unblended) had an alkali metal content of 0.8 p.p.m. and a streaming potential of 0.5 $\mu$amp.

Fluids were prepared from phosphate esters treated as in the examples above. Whole blended fluids were also prepared from untreated phosphate esters and the whole fluid treated as in the examples above. In both types of preparations the final alkali metal content was in the range of 0.1–4.0, usually 0.2–2.0.

Three different types of blended hydraulic fluids were compared to evaluate the erosive characteristics. The first two were composed of 81.5 weight percent tributyl phosphate, 9.1 weight percent tricresyl phosphate, 6.9 weight percent "Ucar FH–25" commercial polyacrylate viscosity index improver, 2.5 weight percent (3',4'-epoxycyclohexyl)methyl ester of 3,4-epoxycyclohexanecarboxylic acid hydrolysis inhibitor, and a small amount of dye. Each type also contained an additional 0.2–0.7 weight percent water.

The first fluid ("Type A") was prepared in accordance with this invention and blended alkali metal contents (sodium) of the various samples were in the range of 0.2–2.0 p.p.m. The second fluid ("Type B") was not treated to lower its alkali metal content; the various samples had alkali metal contents in the range of 18–25 p.p.m. These two types of fluid were compared to the same fluid ("Type C") used as a standard in the aforementioned streaming current measurements; samples of this fluid contained 5–12 p.p.m. alkali metal.

The various samples of these fluids were tested for their valve erosion characteristics in a hydraulic valve simulator having the general configuration shown in the figure. The figure illustrates schematically a section through the simulator. The figure is not drawn to scale; some dimensions have been exaggerated for clarity.

Two nitrided "Nitralloy" blocks 11 and 12 are separated by gasket 13, leaving a clearance between the blocks of approximately 75–100 microniches. Fluid at 3000 p.s.i.g. in high pressure chamber 14 flows through cylindrical passage 15, which has a diameter of approximately 0.075 inch. The fluid flows out of passage 15, between the blocks and over metering edege 16, into low pressure chamber 17. The length ($x$) of the fluid flow path from the end of passage 15 to metering edge 16 is in the range of 0.0001–0.002 inch. It is at the exit of passage 15 and at metering edge 16 that erosion occurs. This erosion is indicated by an increase in the flow rate of the fluid with time at constant pressure. Low pressure chamber 17 is part of an annulus, another section of which is designated 18. The fluid flows through this annulus at low pressure and out through passage 19 to a sump not shown. The fluid flow through the apparatus is at a velocity sufficient to produce Reynolds numbers on the order of 50,000 in the vicinity of the exit of passage 15 and metering edge 16.

The results of the various fluid tests are presented in the table below. Temperatures in the valve simulator were 70°–150° F.; within this range temperature does not have a significant effect on fluid flow rate.

TABLE

| Run | Fluid Type | Water content, wt. percent | Sodium content, p.p.m. | Accumulated run length, hours | Fluid flow rate, cc./min. |
|---|---|---|---|---|---|
| 1 | A | 0.58–0.59 | 0.8 | 0 | 148 |
|   |   |   |   | 10 | 150 |
|   |   |   |   | 25 | 146 |
|   |   |   |   | 50 | 145 |
| 2 | A | 0.41–0.50 | a 1.0 | 0 | 157 |
|   |   |   |   | 20 | 156 |
|   |   |   |   | 60 | 154 |
|   |   |   |   | 82 | 154 |
|   |   |   |   | 100 | 157 |
| 3 | B | 0.63–0.68 | 24.4 | 0 | 159 |
|   |   |   |   | 10 | 161 |
|   |   |   |   | 29 | 173 |
|   |   |   |   | 44 | 194 |
|   |   |   |   | 65 | 210 |
|   |   |   |   | 89 | 226 |
|   |   |   |   | 112 | 234 |
| 4 | C | 0.44 | b 5.5 | 0 | 158 |
|   |   |   |   | 4 | 161 |
|   |   |   |   | 9 | 164 |
|   |   |   |   | 17 | 172 |
|   |   |   |   | 23½ | 180 |
| 5 | A | 0.47 | 1.7 | 0 | 153 |
|   |   |   |   | 21 | 150 |
|   |   |   |   | 40 | 164 |
|   |   |   |   | 60 | 158 |
|   |   |   |   | 80 | 160 |
|   |   |   |   | 100 | 159 |
| 6 | C | 0.27–0.28 | b 5.5 | 0 | 156 |
|   |   |   |   | 3 | 161 |
|   |   |   |   | 5½ | 166 |
|   |   |   |   | 13 | 180 |
|   |   |   |   | 21 | 196 |
| 7 | A | 0.23 | a 1.7 | 0 | 162 |
|   |   |   |   | 10 | 156 |
|   |   |   |   | 25 | 142 |
|   |   |   |   | 50 | 138 |
|   |   |   |   | 75 | 139 |
|   |   |   |   | 100 | 136 | a Estimated.
b Average of four samples.

It is evident from the above data that the Type A fluid, in which the alkali metal content has been reduced in accordance with this invention, is far superior in its erosive characteristics than the high-alkali-metal-content Type B fluid, or the standard Type C fluid. Thus, the Type A fluid, prepared in accoradnce with this invention, is seen to be markedly superior hydraulic fluid, particularly for aircraft use.

The above data and examples are intended to be illustrative only. The scope of the invention is to be considered limited only as defined in the appended claims.

We claim:
1. In a process wherein a hydraulic fluid, containing as its major or sole component at least one phosphate ester, is prepared for use in a hydraulic system, and wherein said fluid or a portion theerof contains an alkali metal contaminant in an amount such that the alkali metal content of the fluid is greater than 4.0 p.p.m., the improvement which consists essentially of reducing said alkali metal content to an amount in the range of 0.1 to 4.0 p.p.m. by contacting said fluid, or a portion thereof with clay, said clay being present in an amount of from 0.1 to 10.0 weight percent of said fluid.

2. The improvement of claim 1 wherein said alkali metal content is reduced by said contacting with clay to an amount in the range of 0.2 to 2.0 p.p.m.

3. The improvement of claim 1 wherein said clay is in a finely divided form which is mixed with said fluid, said clay being present as 0.25 to 5.0 weight percent of said fluid.

4. The improvement of claim 3 wherein said clay is present as 0.25 to 0.50 weight percent of said fluid.

5. In a process wherein a hydraulic fluid, containing as its major or sole component at least one phosphate ester, is prepared for use in a hydraulic system, and wherein said fluid or a portion thereof contains an alkali metal contaminant in an amount such that the alkali metal content of the fluid is greater than 4.0 p.p.m., the improvement which consists essentially of reducing said alkali metal content to an amount in the range of 0.1 to 4.0 p.p.m. by contacting said fluid or a portion thereof with an ion exchange resin onto which the alkali metal cation contaminant is preferentially adsorbed.

6. The process of claim 5 wherein said alkali metal content is reduced by said fluid contacting with clay to an amount in the range of 0.2 to 2.0 p.p.m.

7. The process of claim 5 wherein the cation which is displaced from said ion exchange resin by said alkali metal cation contaminant is a cation which is not readily soluble in said fluid.

8. In a process wherein a hydraulic fluid, containing as its major or sole component at least one phosphate ester, is prepared for use in a hydraulic system, and wherein said fluid or a portion thereof contains an alkali metal contaminant in an amount such that the alkali metal content of the fluid is greater than 4.0 p.p.m., the improvement which consists essentially of reducing said alkali metal content to an amount in the range of 0.1 to 4.0 p.p.m. by extraction of said alkali metal contaminant from said fluid or a portion thereof with water.

9. The process of claim 8 wherein said alkali metal content is reduced by said extraction with water to an amount in the range of 0.2 to 2.0 p.p.m.

10. The process of claim 8 wherein said water is present in an amount of 0.25 to 5.0 volumes of water per volume of said fluid.

11. In a process wherein a hydraulic fluid, containing as its major or sole component at least one phosphate ester, is prepared for use in a hydraulic system, and wherein said fluid or a portion thereof contains an alkali metal contaminant in an amount such that the alkali metal content of the fluid is greater than 4.0 p.p.m., the improvement which consists essentially of reducing said alkali metal content to an amount in the range of 0.1 to 4.0 p.p.m. by filtering said fluid or a portion thereof to remove that portion of said alkali metal contaminant which is in a form insoluble in said fluid.

References Cited

UNITED STATES PATENTS

| | | | |
|---|---|---|---|
| 2,275,210 | 3/1942 | Urbain et al. | 252—193 X |
| 2,315,495 | 4/1943 | Beeg et al. | 260—990 X |
| 2,470,792 | 5/1949 | Schlesinger et al. | 252—78 |
| 2,570,480 | 10/1951 | Pontz | 260—990 X |
| 2,573,658 | 10/1951 | Weesner | 260—990 X |
| 2,600,719 | 6/1952 | Wood | 252—189 |
| 2,636,048 | 4/1953 | Fontoy | 260—990 X |
| 2,716,123 | 8/1955 | Frostick et al. | 260—348 C |
| 2,786,067 | 3/1957 | Frostick et al. | 260—348 C |
| 2,862,886 | 12/1958 | Davies et al. | 252—78 |
| 3,487,020 | 12/1969 | Peeler et al. | 252—78 |

FOREIGN PATENTS

| | | | |
|---|---|---|---|
| 687,539 | 5/1964 | Canada | 260—348.3 |

LEON D. ROSDOL, Primary Examiner

H. A. PITLICK, Assistant Examiner

U.S. Cl. X.R.

252—75, 78, 189, 193